United States Patent
Svanbro et al.

(10) Patent No.: US 6,535,925 B1
(45) Date of Patent: Mar. 18, 2003

(54) PACKET HEADER COMPRESSION USING DIVISION REMAINDERS

(75) Inventors: Krister Svanbro, Lulea (SE); Torbjörn Einarsson, Stockholm (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 31 days.

(21) Appl. No.: 09/671,756

(22) Filed: Sep. 26, 2000

Related U.S. Application Data

(60) Provisional application No. 60/164,355, filed on Nov. 9, 1999.

(51) Int. Cl.[7] ............................................. G06F 15/16
(52) U.S. Cl. ..................... 709/247; 709/216; 709/217; 341/60; 370/393; 370/465; 370/474
(58) Field of Search ..................... 341/50–109; 370/389, 370/465, 466, 474, 477, 392, 395, 409, 405, 393; 707/101, 105; 709/247, 216, 217

(56) References Cited

U.S. PATENT DOCUMENTS

| | | | |
|---|---|---|---|
| 5,144,623 A | | 9/1992 | Bernardini ................. 370/94.1 |
| 5,293,379 A | | 3/1994 | Carr ......................... 370/94.1 |
| 5,345,451 A | * | 9/1994 | Uriu et al. .................... 371/42 |
| 5,521,940 A | * | 5/1996 | Lane et al. .................. 375/240 |
| 5,813,011 A | | 9/1998 | Yoshida et al. ............. 707/101 |
| 5,835,730 A | * | 11/1998 | Grossman et al. ........... 709/247 |
| 6,032,197 A | * | 2/2000 | Birdwell et al. ............. 709/247 |
| 6,292,840 B1 | * | 9/2001 | Blomfield-Brown et al. ................ 709/247 |
| 6,317,433 B1 | * | 11/2001 | Galand et al. ........... 370/395.2 |
| 6,385,199 B2 | * | 5/2002 | Yoshimura et al. ......... 370/393 |

FOREIGN PATENT DOCUMENTS

| | | |
|---|---|---|
| EP | PCT/SE 00/02188 | 4/2001 |
| WO | WO 99/04522 | 1/1999 |
| WO | WO 00/49748 | 8/2000 |
| WO | WO 00/79762 A1 | 12/2000 |

\* cited by examiner

*Primary Examiner*—Michael Tokar
*Assistant Examiner*—Linh V Nguyen
(74) *Attorney, Agent, or Firm*—Jenkens & Gilchrist, A Professional Corporation

(57) ABSTRACT

The present invention is directed to providing a method and apparatus for efficiently compressing and reconstructing a header of a real time communication packet. In a header compressor, a header field value is applied to a modulo X operator which can, for example, divide the header field value by a value X, and output the remainder. Optionally, a checksum may be appended to the remainder. The header field value may be scaled prior to being applied to the modulo X operator. The compressed header field which is output from the header compressor includes the remainder with or without the checksum appended. A header decompressor includes a field reconstructor which reconstructs the received compressed header field in response to the remainder value and range information. The range information represents a range of possible field values which can be reconstructed from the received remainder value.

20 Claims, 11 Drawing Sheets

PACKET HEADER COMPRESSION USING DIVISION REMAINDERS

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/164,355, filed Nov. 9, 1999.

FIELD OF THE INVENTION

The invention relates generally to packet communications and, more particularly, to header compression in packet communications.

BACKGROUND OF THE INVENTION

The term header compression (HC) refers to the art of minimizing the necessary bandwidth for information carried in packet headers on a per hop basis over point-to-point links. Header compression is usually realized by sending static information only initially. Semi-static information is then transferred by sending only the change (delta) from the previous header, and completely random information is sent without compression. Hence, header compression is usually realized with a state machine.

Conventional header compression algorithms are designed basically for narrow band wired channels with a rather small complexity at the receiving decompression side. Also, the complexity at the sending compressing side is kept low to allow efficient implementations in routers where as much computing capacity as possible is needed for the routing. Further, the wired channels for which existing header compression algorithms are designed typically have very small probabilities for bit errors (e.g., a bit error rate of $10^{-6}$). Wireless channels (generally characterized by lossy, narrow bandwidth links) typically have a much higher probability for error, so header compression for use in wireless channels should be designed with a much larger bit error probability in mind (e.g., bit error rates up to $10^{-3}$).

Conventional compression schemes for RTP/UDP/IP headers are often based on soft-state machines with states called contexts. The de-compressor context is often updated by each packet received, and if a packet is lost on the link, the context will become invalid. When the decompressor context is invalidated, all successive packets have to be discarded until the soft-state is updated by a full (uncompressed) header. A request for update is sent from the receiving end when the decompressor realizes that the first packet is discarded (or lost), and then it takes a full round-trip (from receiving end to transmitting end and back) before the update (packet with uncompressed header) arrives. This often results in many lost packets. The loss of context state may also occur if the receiving de-compressor fails to successfully de-compress a compressed header.

If the payload for the packets with the compressed headers carries a real time service, the loss of several successive packets may be disastrous for the quality of that real time service. For example, the quality of real time speech service will degrade substantially with increased packet loss rate due to successive lost speech frames. If the speech frame errors have a bursty characteristic, the speech quality will be worse than for the same speech frame error rate but with a less correlated frame error characteristic.

One way of reducing the probability for invalid context states, and thereby packet loss, is to increase the intelligence at the receiver, for example by increasing the probability for the de-compressor to successfully estimate (guess) what the correct context state should be, without using more bits per compressed header. In the example of real time speech service, the conventional RTP time stamp field value typically increments in a predictable fashion (and thus can be reliably predicted or guessed) during periods of speech, but after silent or non-speech periods the time stamp has a more randomized value from the receiver's point of view.

The existing standard for compression of RTP/UDP/IP headers (see, e.g., Steven Casner and Van Jacobson, *Compressing IP/UDP/RTP Headers for Low-Speech Serial Links*, IETF RFC 2508, IETF Network Working Group, February 1999, incorporated herein by reference) is referred to herein as CRTP. In CRTP the time stamp delta value is coded with a varying number of bits depending on the value. A large time stamp change since the last packet causes a large delta value, which disadvantageously requires more bits in the compressed header to carry the delta value indicative of the time stamp information.

Whenever DTX (discontinuous transmission) or silent suppression is used in a real time speech service, the time stamp field of the RTP header will have a stochastic behavior difficult to predict in a stream of RTP/UDP/IP packets carrying speech. Hence, the time stamp field is one of the most difficult fields to de-compress at the receiver by means of guessing. In CRTP, the time stamp delta value is coded with a number of bits that depends on the size of the time stamp change since the last packet. Thus, long silent or non-speech periods require more bits to delta-modulate the time stamp field, so the first header after a silent period will typically be larger than in speech packets corresponding to a speech period.

It is therefore desirable to provide a technique for header compression/decompression without the aforementioned disadvantages associated with conventional schemes.

SUMMARY OF THE INVENTION

The present invention advantageously provides techniques for efficiently compressing and reconstructing the time stamp value of a real time communications packet whose time stamp value does not fall within a normally expected sequence of time stamp values. A first part of the time stamp value is selected by the header compressor and transmitted. A second part of the time stamp value is estimated by the header decompressor based on elapsed time between receipt of consecutive packets. The header decompressor combines the second part with the first part received from the header compressor to produce a reconstructed time stamp value.

Further, the present invention is more particularly directed to providing techniques for efficiently compressing and reconstructing a header of a real time communication packet. In a header compressor, a header field value (which may be scaled) is applied to a modulo X operator which can, for example, divide the header field value by a value X, and output the remainder. Optionally, a checksum may be appended to the remainder. Thus, the compressed header field includes the remainder as output from the modulo X operator, with or without the checksum appended therto. A header decompressor includes a field reconstructor which reconstructs the received compressed header field in response to the remainder value and range information. The range information represents a range of possible field values which can be reconstructed from the received remainder value.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
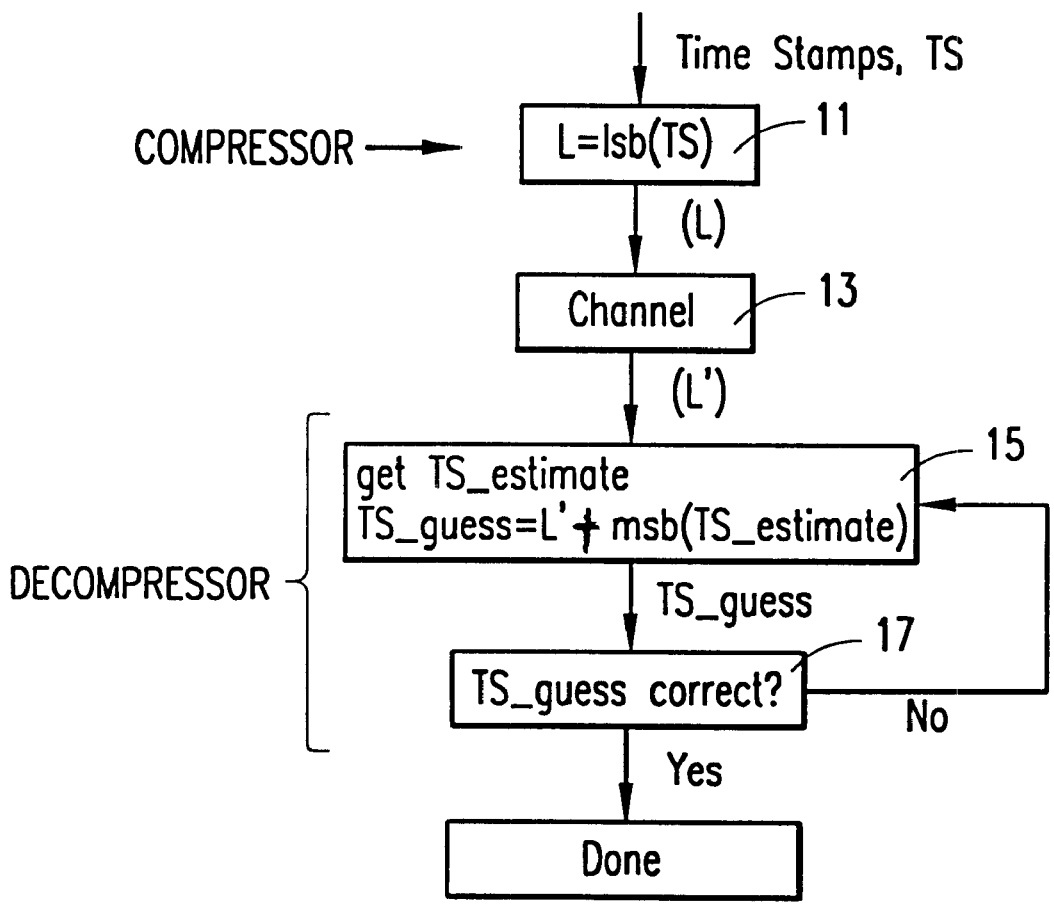
FIG. 1 conceptually illustrates exemplary time stamp compression and decompression techniques according to the invention.

FIG. 1 conceptually illustrates exemplary time stamp compression and decompression techniques for use in real time communications applications, for example real-time speech applications, according to the invention. Basically, the header decompressor at the receiver uses a local clock to estimate the elapsed time between the last speech packet before a period of speech inactivity and the first speech packet after a period of speech inactivity. Based on this elapsed time estimate, the header decompressor can make an estimate of the difference (or the delta) between the time stamp fields of these two speech packets that bound the period of speech inactivity. This estimate of the difference between time stamp values can be used, in combination with the known time stamp value of the last speech packet before speech inactivity, to make an educated guess of the time stamp value of the first speech packet after speech inactivity.

As shown in FIG. 1, at the header compressor of the transmitting end, only the least significant bits (lsb's) L of the time stamp TS of the first speech packet after speech inactivity are selected at 11 for transmission across the channel 13. The channel 13 can be a wireless channel, for example, a UMTS air interface or other cellular radio interface.

At 15 in the receiving end, an estimate of the time stamp of the received packet can be produced in the following exemplary manner. Let packet n−1 be the last received packet before the speech inactivity period, and let packet n designate the next successive speech packet, namely the first speech packet after the period of speech inactivity. If the header decompressor at the receiving end notes the time T(n−1) at which packet n−1 arrived, and also notes the time T(n) at which packet n arrived, then an absolute time difference between the arrival of the two packets can be estimated by subtracting T(n−1) from T(n). This time difference represents the elapsed time between the arrivals of packet n−1 and packet n. The elapsed time can be converted into time stamp units by multiplying the elapsed time by an estimate of how much the time stamp value changes per unit time.

Let delta_T be the elapsed time represented by the aforementioned time difference T(n)−T(n−1), and let TS_change be the estimate of how much the time stamp value changes per unit time. The value TS_change can then be multiplied by the value delta_T to produce an estimate of how many time stamp units are associated with the elapsed time delta_T, in other words, an estimate of the difference between the time stamp values of packet n−1 and packet n. Thus, an estimated value of the time stamp of packet n, TS_estimate, is given by adding the estimated difference in time stamp values (TS_change multiplied by delta_T) to the known time stamp value of packet n−1. Once TS_estimate is determined at 15, then the most significant bits of TS_estimate are appended to the received version L' of the least significant bits L of the actual time stamp TS, thereby yielding a guess, TS_guess, of the time stamp value of packet n. At 17, the header decompressor attempts to determine whether TS_guess is a correct guess of the original time stamp TS. If not, then another guess can be made at 15, and the process can be repeated until a correct guess is produced or a timeout condition is satisfied.

Figure 2:
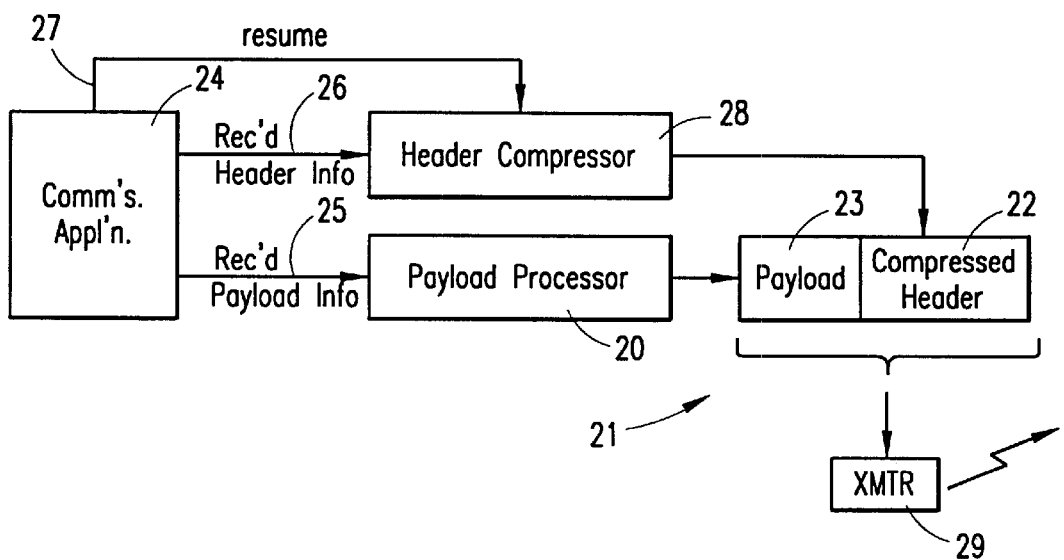
FIG. 2 illustrates an exemplary packet data transmitting station according to the invention.

FIG. 2 illustrates an exemplary packet data transmission station which can perform the exemplary time stamp compression techniques illustrated in FIG. 1. The transmission station can be, for example, a fixed-site or mobile transmitter operating in a cellular communication network. In the embodiment of FIG. 2, a packet data communications application 24 produces payload information at 25 and header information at 26. The payload information can be used in conventional fashion by payload processor 20 to produce a payload 23, and the header information 26 is applied to a header compressor 28. The header compressor 28 compresses the header information to produce a compressed header 22. The compressed header 22 and payload 23 constitute a packet 21. A conventional radio transmitter 29 can use well known techniques to transmit the packet 21 over a radio link such as a cellular radio link.

The communications application 24 further provides a resume signal 27 which indicates that the current payload and header information at 25 and 26 correspond to an RTP speech packet that is the first speech packet to be transmitted after a period of speech inactivity (corresponding to packet n described above with respect to FIG. 1). The header compressor 28 is responsive to activation of the signal 27 for performing inventive time stamp compression techniques including, for example, the time stamp compression techniques illustrated in FIG. 1.

Figure 3:
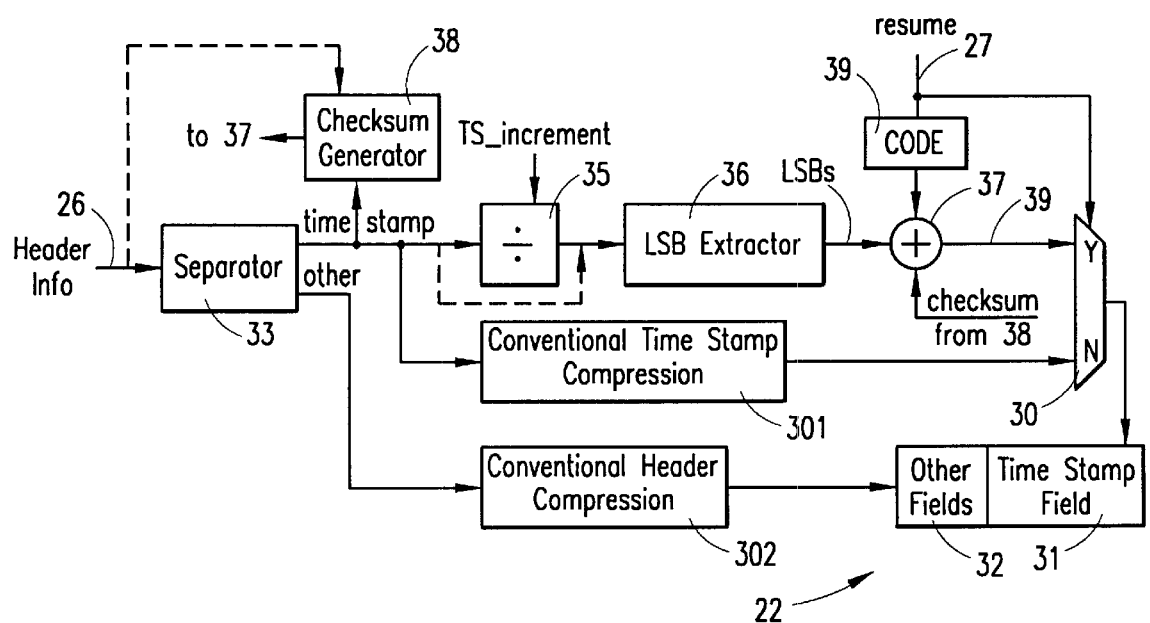
FIG. 3 illustrates exemplary embodiments of the header compressor of FIG. 2.

FIG. 3 illustrates exemplary embodiments of the header compressor 28 of FIG. 2. In the header compressor embodiments of FIG. 3, a separator 33 receives the header information 26 from the communications application 24. The separator 33 separates the time stamp field information from the other header information received at 26, so that the time stamp information can be compressed separately from the remaining header information. A divider 35 scales the time stamp value by dividing the time stamp value by a scale value, TS_increment. Taking the exemplary case of a real-time speech service carrying speech information produced from a speech codec having a constant bit rate, the time stamp can be expected to increase by a constant incremental amount with each successive packet during a period of speech activity. The value TS_increment represents an estimate of this constant incremental amount, and can be determined, for example, by empirical observation. Thus, the divider 35 operates to scale down the time stamp value, thereby reducing the number of bits necessary to represent the time stamp value. In other embodiments, the divider 35 can be omitted or used selectively, as shown in broken line.

A least significant bit extractor 36 receives the scaled time stamp value from divider 35, and extracts the least significant bits (LSBs) from that scaled value. At 37, an appending apparatus appends to the LSBs a resume code produced by an encoder 39 in response to activation of the resume signal 27 of FIG. 2. The apparatus 37 can also append a checksum (e.g., CRC checksum), generated from the time stamp and (optionally) other header information as desired (see broken line in FIG. 3), by an optional checksum generator 38. The output of the appending apparatus 37 is applied to an input 39 of a selector 30 whose other input is connected to the output of a conventional time stamp compressor 301 that also receives the time stamp value from separator 33.

The selector 30 is controlled by the resume signal 27, so that if the resume signal 27 is active, then the LSBs, the resume code, and the checksum are provided via the selector 30 to a time stamp field 31 of the compressed header 22 of FIG. 2. On the other hand, if the resume signal 27 is inactive, then the output of the conventional time stamp compression section 301 is provided to the time stamp field 31.

Also as shown in FIG. 3, the other header information (non-time stamp information) output from separator 33 can be compressed using a conventional header compression techniques at 302, and the resulting compressed header information can then be provided to the other fields 32 of the compressed header 22 as is conventional.

Figure 3A:
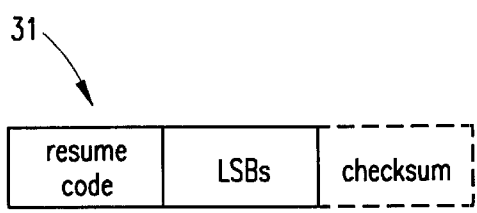
FIG. 3A illustrates an example of the time stamp field of FIG. 3.

FIG. 3A illustrates the time stamp field 31 produced when the resume signal 27 is active in FIGS. 2 and 3. As shown in FIG. 3A, the time stamp field 31 includes the resume code, the LSBs of the scaled time stamp value and, as shown in broken line, optionally includes the checksum generated at 38.

Figure 4:
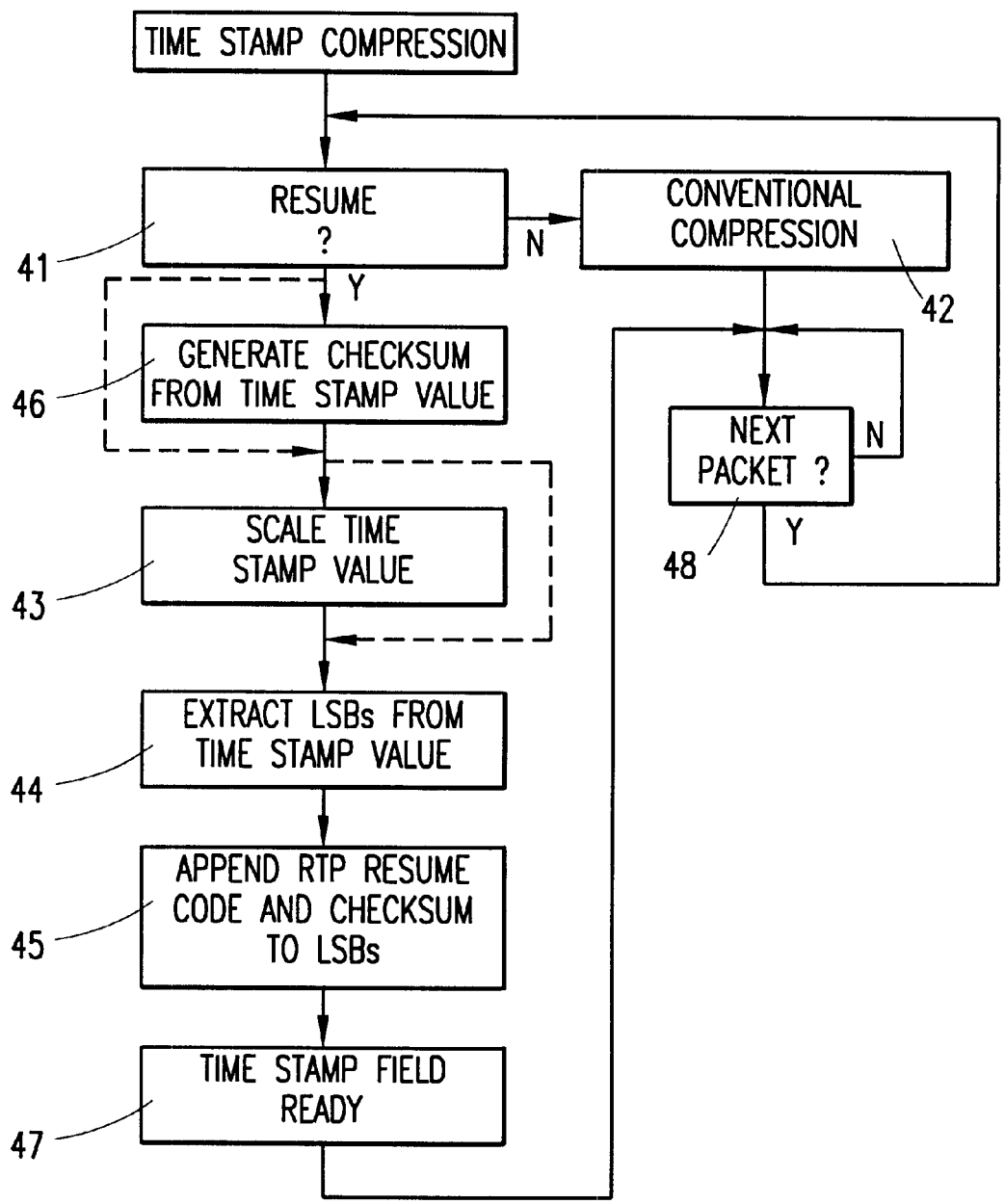
FIG. 4 illustrates exemplary operations which can be performed by the header compressor embodiments of FIGS. 2 and 3.

FIG. 4 illustrates exemplary time stamp compression operations which can be performed by the exemplary header compressor embodiments of FIG. 3. It is first determined at 41 whether the resume signal is active. If not, then time stamp compression is performed in conventional fashion at 42, and the next packet is awaited at 48. If the resume signal is active at 41, then the time stamp value (see TS in FIG. 1) is used to generate a checksum at 46. Thereafter, the time stamp value is scaled at 43 using the TS_increment value. Thereafter, the least significant bits are extracted from the scaled time stamp value at 44, and the resume code and the checksum (optional) are appended to the least significant bits at 45. The broken lines in FIG. 4 indicate that the checksum generation and scaling operations at 46 and 43 can be omitted or selectively applied in other embodiments. After the least significant bits and the resume code (and optionally the checksum) have been appended together at 45, then the time stamp field is ready for assembly into the compressed header at 47, after which the next packet is awaited at 48.

Figure 5:
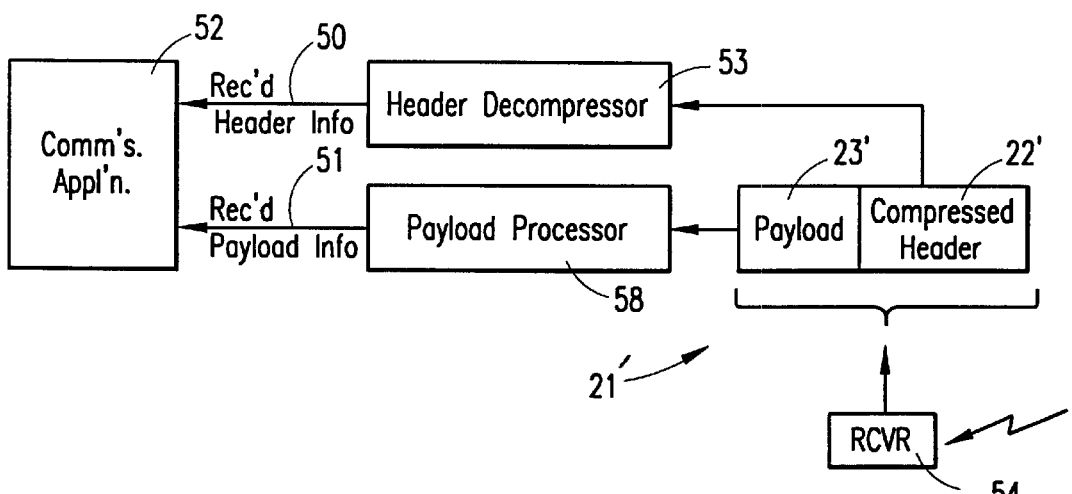
FIG. 5 illustrates an exemplary packet data receiving station according to the invention.

FIG. 5 illustrates an exemplary embodiment of a packet data receiving station which can perform the exemplary time stamp decompression techniques illustrated in FIG. 1. This receiving station can be, for example, a fixed-site or mobile receiver operating in a cellular communication network. In the embodiment of FIG. 5, a conventional radio receiver 54 can use well known techniques to receive from a radio communication link, for example a cellular radio link, a received version 21' of a transmitted packet such as the packet 21 illustrated in FIG. 2. As shown in FIG. 5, such a received version 21' would include a received version 22' of the compressed header 22 of FIG. 2 and a received version 23' of the payload 23 of FIG. 2. The received payload version 23' can be provided to a payload processor 58 which can produce, in conventional fashion, received payload information for input at 51 to a packet data communications application 52. The received compressed header version 22' is provided to a header decompressor 53 which decompresses the received version 22' to produce received header information for input at 50 to the communications application 52.

Figure 6:
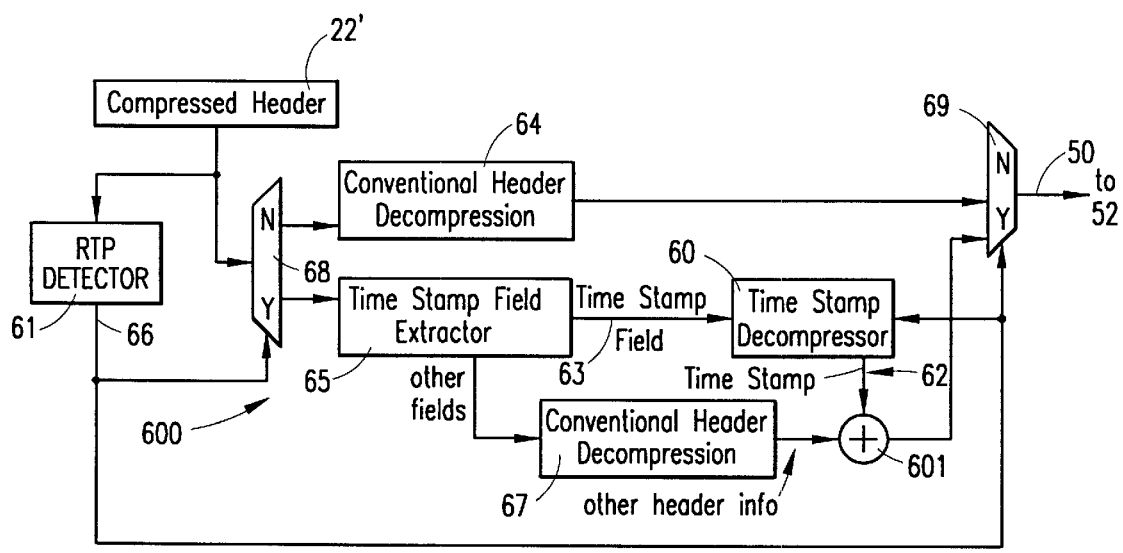
FIG. 6 illustrates exemplary embodiments of the header decompressor of FIG. 5.

FIG. 6 illustrates an exemplary embodiment of the header decompressor of FIG. 5. The received version 22' of the compressed header is input to an RTP detector 61 which can use conventional techniques to detect whether or not the received packet is an RTP packet. In response to detecting that the packet is not an RTP packet, which indicates that a period of speech inactivity is occurring, the detector 61 activates an output signal 66 which controls selectors 68 and 69 appropriately to cause the compressed header to be processed by a conventional header decompressor 64. If the detector 61 determines that an RTP packet has been received, then control signal 66 controls selectors 68 and 69 such that the compressed header is processed through a processing path 600 which implements time stamp field decompression according to the invention.

The processing path 600 includes a separator 65 which separates the time stamp field from the other fields of the received version 22' of the compressed header. The received versions of fields other than the time stamp field (see 32 of FIG. 3) can then be applied to a conventional header decompressor at 67. The received version of the time stamp field at 63 is input to a time stamp decompressor 60. The time stamp decompressor also receives as an input the control signal 66 output from RTP detector 61. In response to the control signal 66 and the time stamp field received at 63, the time stamp decompressor 60 outputs a time stamp at 62. This time stamp is appended by appending apparatus 601 to the other decompressed header information produced by decompressor 67, thereby forming the desired received header information which is selectively coupled via selector 69 to communications application 52 of FIG. 5 (see 50 in FIGS. 5 and 6).

Figure 7A:
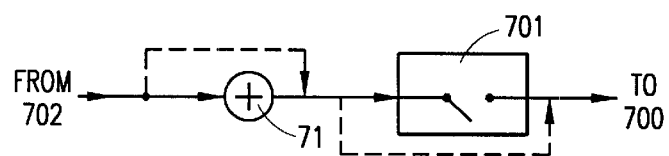
FIG. 7A illustrates other exemplary embodiments of the time stamp decompressor of FIGS. 6 and 7.
Figure 7:
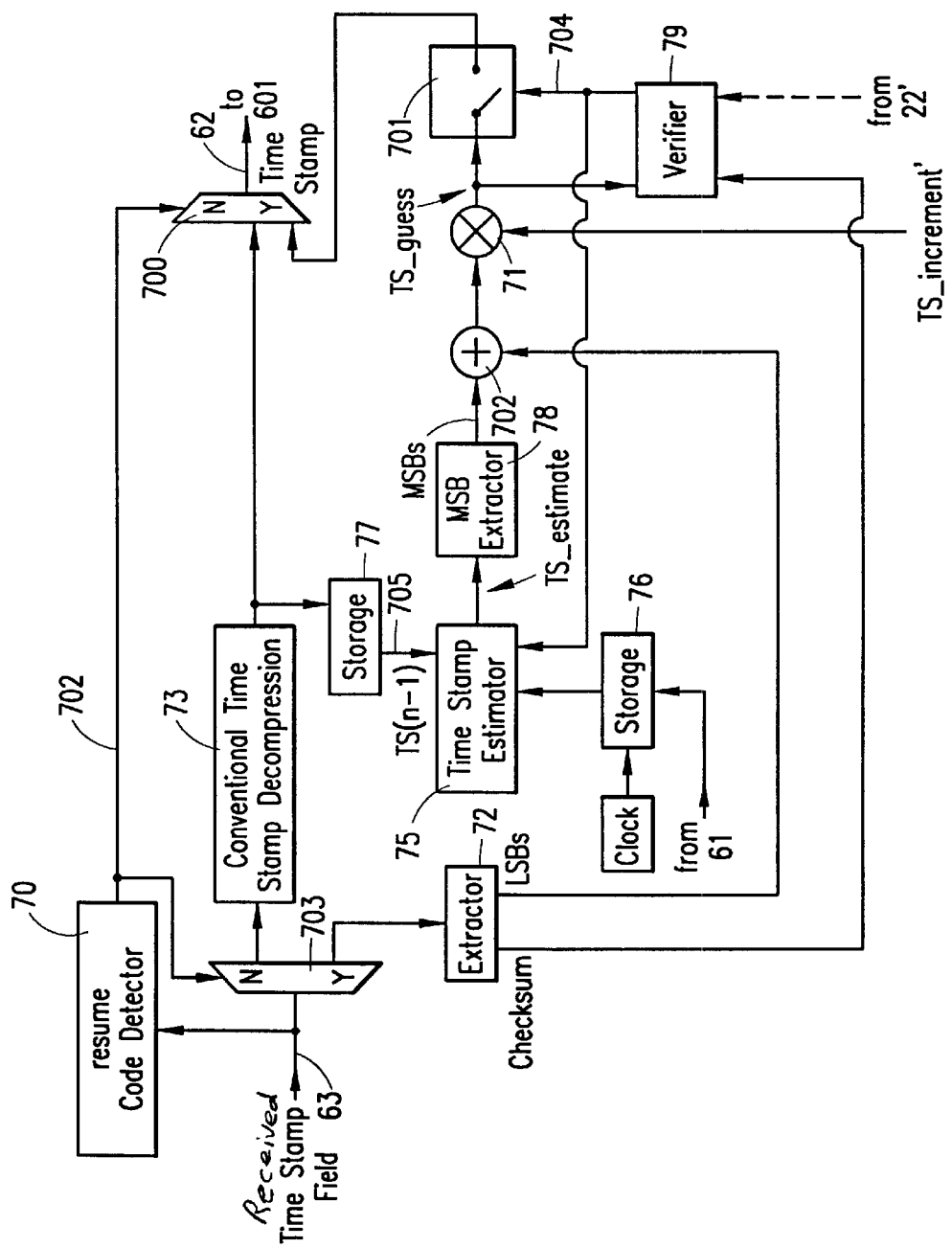
FIG. 7 illustrates an exemplary embodiment of the time stamp decompressor of FIG. 6.

FIG. 7 illustrates exemplary embodiments of the time stamp decompressor 60 of FIG. 6. In the embodiments of FIG. 7, the time stamp field received at 63 is input to a code detector 70 for detecting the resume code of FIG. 3. If the resume code is not detected, then the received RTP packet is not the first speech packet after a period of speech inactivity, so the code detector 70 outputs a control signal 702 which appropriately controls selectors 703 and 700 to permit a conventional time stamp decompressor 73 to decompress the time stamp field and produce the desired time stamp at 62 (see also FIG. 6).

If the code detector 70 detects the resume code, then the control signal 702 controls selectors 703 and 700 such that the time stamp field is decompressed according to above-described exemplary time stamp field decompression techniques according to the invention. In this case, the received time stamp field 63 is input via selector 703 to an extractor 72 which extracts received versions of the LSBs and checksum (see FIG. 3A) from the time stamp field. It should be noted that the resume code is merely one example of a technique for triggering the desired decompression operations.

A time stamp estimator 75 can produce the time stamp estimate, TS_estimate, generally as described above relative to FIG. 1. The time stamp estimator has an input 705 for receiving the time stamp of packet n−1, namely, the time stamp of the last RTP packet received before a period of speech inactivity. This time stamp value TS(n−1), produced by decompressor 73, is stored in a storage unit 77, which in turn is coupled to the estimator input 705. Each RTP time stamp output from decompressor 73 can be stored at storage unit 77 (which can be a single register), thereby insuring that the time stamp TS(n−1) of packet n−1 will be available to the time stamp estimator 75 when packet n arrives.

The time stamp estimator 75 also receives information indicative of the times T(n) and T(n−1) at which packet n and packet n−1 were received. This time information is available from a storage unit 76 which is coupled to receive local time information from a local clock 74. For each RTP packet detected by the detector 61 in FIG. 6, the storage unit 76 stores the time of arrival of that packet, as measured by the local clock 74. The storage unit 76 thus need only be a two-deep stack in order to capture the times of arrival of the aforementioned packets n and n−1.

The time stamp estimator 75 also has access to the time stamp change value TS_change as described above, and the time stamp increment value TS_increment as described above. The time stamp estimator is operable in response to the local time information received from storage unit 76, the time stamp value TS(n−1) received from storage unit 77, and the time stamp change and time stamp increment values to produce TS_estimate generally as described above. TS_estimate is applied to a most significant bit extractor 78 which extracts therefrom the most significant bits (MSBs), which constitute a truncated estimate of the time stamp value. An appending apparatus 702 appends the least significant bits (LSBs) received from extractor 72 to the most significant bits (MSBS) output from extractor 78, and the result is multiplied by TS_increment at multiplier 71 thereby producing TS_guess as described above. The time stamp estimator 75 uses TS_increment to down scale its time stamp estimate generally in the same manner described above at 35 in FIG. 3 in order to permit accurate combining of the MSBs and LSBs at 702, so the multiplier 71 is used to re-scale the result to produce TS_guess.

A verifier 79 receives as input TS_guess and the received version of the checksum from extractor 72. The verifier 79 is operable to generate a checksum from the received TS_guess value and (optionally) other information received in the compressed header 22' (see broken line), and compare this generated checksum to the received checksum. If the checksums match, then the verifier output signal 704 activates a connection unit 701 which then connects the TS_guess value to selector 700.

If the verifier 79 determines that the received checksum does not match the generated checksum, then the control signal 704 maintains the connection unit 701 in its open (illustrated) position, and informs the time stamp estimator 75 that another time stamp estimate is needed. The time stamp estimator can thus continue to produce time stamp estimates until the checksums match or until satisfaction of a timeout condition implemented, for example, in either the time stamp estimator 75 or the verifier 79.

The number of bits in TS_estimate can be, for example, equal to the number of bits in the time stamp value received by LSB extractor 36 of FIG. 3, and the number of MSBs extracted by extractor 78 in FIG. 7 can be, for example, equal to the number of most significant bits that remain (and are discarded) after extraction of the LSBs at 36 in FIG. 3. The number of LSBs extracted at 36 and the number of MSBs extracted at 78 can be determined, for example, by empirical observation to determine what combination of LSB/MSB extraction produces desired results under various conditions. For example, different combinations of LSB/MSB extraction can be used, depending on factors such as transmission delay variations, and clock precision in the compressor and decompressor. The desired combination of LSB/MSB extraction can thus be determined by empirical observation under various transmission delay variation conditions and various clock precision conditions. As one example, the number of MSBs extracted at 78 could depend on the precision of clock 74. The more precise is clock 74, the more MSBs can be extracted at 78, and vice versa. The number of LSBs extracted at 36 can then be determined based on the number MSBs extracted at 78.

The compressor and decompressor can be pre-programmed to implement a desired combination of LSB/MSB extraction, or the combination can be dynamically changeable during the course of the packet flow. For example, the compressor can select the number of LSBs to be extracted based on the actual change in the time stamp value, and can signal this information to the decompressor, for example, as a part of the resume code illustrated in FIG. 3A.

FIG. 7A illustrates in broken lines alternative embodiments of the FIG. 7 decompressor wherein: the connection unit 701 (and verifier 79) of FIG. 7 are either omitted or used selectively in correspondence to the use or omission of the checksum in FIG. 3; and/or the multiplier 71 is either omitted or used selectively in correspondence to the use or omission of the divider 35 in FIG. 3. The estimator 75 scales TS_estimate or omits scaling thereof in correspondence to the use or omission of divider 35 and multiplier 71.

Figure 8:
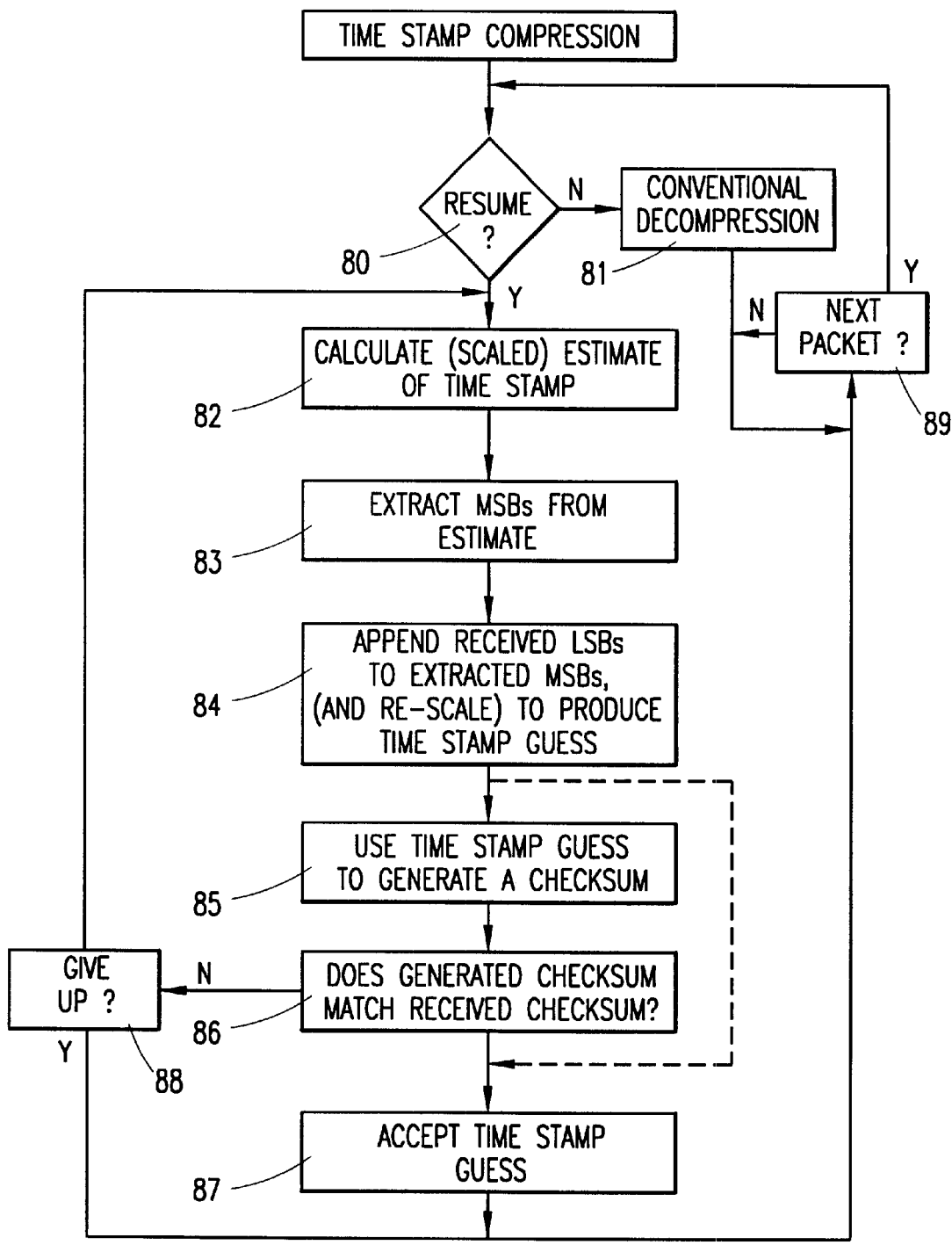
FIG. 8 illustrates exemplary operations which can be performed by the time stamp decompressor embodiments of FIGS. 6–7A.

FIG. 8 illustrates exemplary time stamp decompression operations which can be performed by the time stamp decompressor embodiments of FIGS. 6–7A. It is first determined at 80 whether or not the time stamp field includes the resume code. If not, then the time stamp field is decompressed using conventional decompression techniques at 81, and the next packet is then awaited at 89. If the resume code is detected at 80, then the time stamp estimate (TS_ estimate) is calculated at 82 (with scaling as desired), and the most significant bits are extracted therefrom at 83. At 84, the least significant bits received in the compressed header are appended to the most significant bits extracted from the scaled estimate, and the result is (re-scaled as necessary) is the time stamp guess (TS_guess). Thereafter at 85, the time stamp guess is used to generate a checksum, and the generated checksum is compared at 86 to the checksum received in the time stamp field. If the generated checksum matches the received checksum, then the time stamp guess is accepted at 87, and the next packet is then awaited at 89. If the generated and received checksums do not match at 86, it is then determined at 88 whether or not to give up estimating the time stamp, for example, based on a predetermined elapsed time value, or a predetermined number of guesses. If it is decided not to give up at 88, then another scaled time stamp estimate is calculated at 82, and the operations at 83–86 are repeated. In making another time stamp estimate, the estimator 75 can, for example, change one or more of the least significant bits of the MSBs that will be extracted from the estimate. In one example, if changing a particular bit (or bits) results in successful re-estimation of the time stamp of a given packet, then this same change can be tried first when re-estimating the time stamp of a subsequent packet. If it is decided to give up at 88, then the next packet is awaited at 89.

The broken lines in FIG. 8 correspond to the embodiments of FIG. 7A, wherein checksum verification is omitted, or performed selectively.

Figure 9:
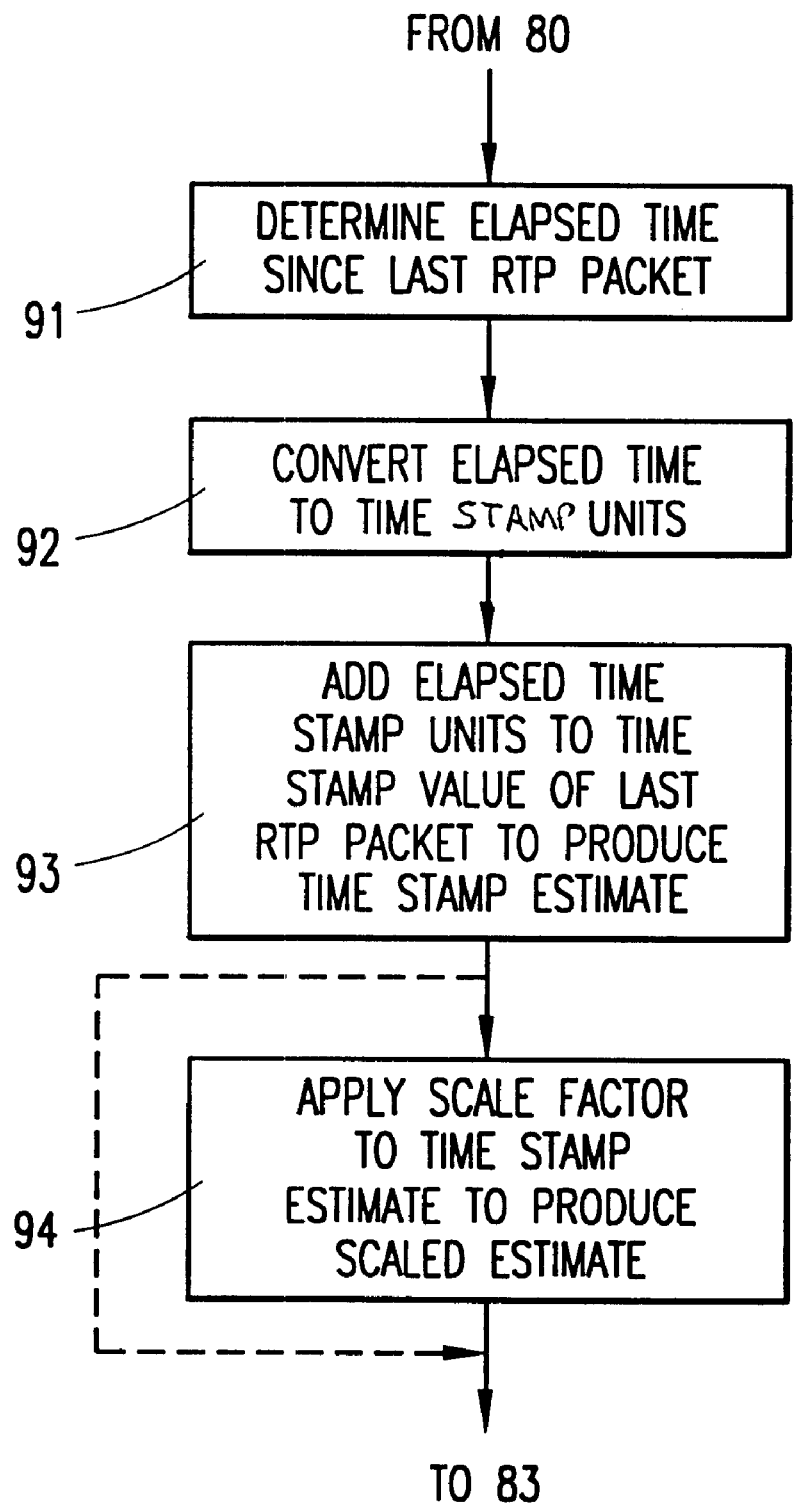
FIG. 9 illustrates exemplary operations which can be performed in FIG. 8 to calculate the scaled time stamp estimate.

FIG. 9 illustrates exemplary operations which can be performed at 82 in FIG. 8 to calculate the estimate of the time stamp. At 91, the elapsed time since the last RTP packet, (T)n−T(n−1), is determined. At 92, the elapsed time is converted into time stamp units (using TS_change). At 93, the number of elapsed time stamp units determined at 92 is added to the time stamp value (TS(n−1)) of the last RTP packet (packet n−1) to produce a time stamp estimate. At 94, a scale factor (TS_increment) is applied to the time stamp estimate produced at 93, thereby to produce the desired scaled time stamp estimate. The broken lines in FIG. 9 correspond to the embodiments of FIG. 7A, wherein scaling is omitted, or performed selectively.

In one exemplary mode of operation, the resume code of FIG. 3A is not needed. In this mode, the time stamp compression and decompression techniques of FIG. 1 are always used, so the selectors 30, 703 and 700 (see FIGS. 3 and 7) are always controlled to select "Y". Correspondingly, the operations at 41 and 42 in FIG. 4, and the operations at 80 and 81 in FIG. 8, would be omitted in this mode.

It should be apparent that the methodology set forth in the above text and in U.S. patent application Ser. No. 09/335, 550, filed Jun. 18, 1999, and incorporated herein by reference, provides, among others, the following exemplary advantages: the number of bits needed to code the time stamp value is reduced; the number of bits needed to code the time stamp value can be held constant regardless of the size of the time stamp change; and, because the absolute time stamp value is encoded at the compressor rather than encoding the amount of the time stamp change, robustness is increased.

Further, in view of the advancements set forth above, Applicants have uncovered further advances in header compression/decompression technologies. In inventive header compressor/decompressor embodiments illustrated in FIGS. 10–14, header compression is achieved by sending, instead of the full header field value, only the header field value modulo X. The header field value modulo X is the remainder that results from dividing the header field value by X. If X=16, for example, then the four least significant bits of the header field represent the aforementioned remainder, and thus directly constitute the header field value modulo X. Clearly, whenever X is a power of 2, the remainder is directly constituted by some number of least significant bits of the header field.

Figure 10:
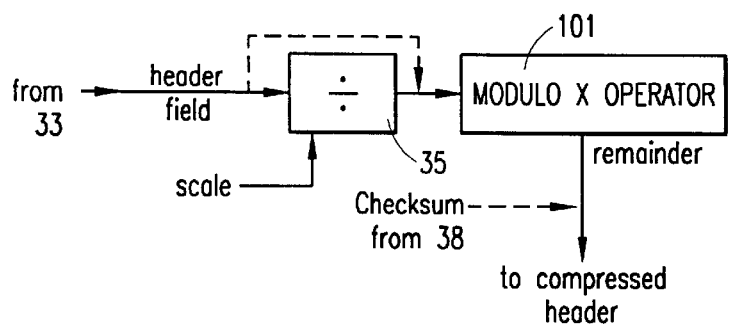
FIG. 10 diagrammatically illustrates a portion of a header compressor which implements an embodiment of the present invention.

FIG. 10 diagrammatically illustrates a portion of a header compressor which implements the modulo X operation. Any given header field received, for example, from the separator 33 of FIG. 3 can be advantageously compressed by the header compressor embodiment of FIG. 10. As shown in FIG. 10, a divider 35 can be used to scale the header field value, or can optionally be omitted as shown by broken line. The header field value (scaled or not) is applied to a modulo X operator 101 which can, for example, divide the header field value by X, and output the remainder. FIG. 10 also illustrates the option of appending to the remainder a checksum (such as generated at 38 in FIG. 3 above). Thus, the compressed header field includes the remainder as output from modulo X operator 101, with or without the checksum appended thereto. It will be evident from the following description that the compression/decompression techniques described with respect to FIGS. 10–14 are applicable not only to the time stamp fields described above, but are generally applicable to a variety of header fields.

Figure 11:
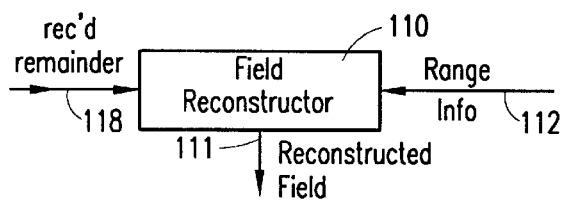
FIG. 11 diagrammatically illustrates a portion of a header decompressor according to an embodiment of the present invention.

FIG. 11 diagrammatically illustrates a portion of a header decompressor according to the invention, including a field reconstructor 110 which reconstructs the header field in response to the remainder value (compressed header field value) received at 118. The field reconstructor 110 uses range information provided at 112 in combination with the received remainder value to produce the reconstructed field at 111. The range information at 112 represents a range of possible field values which can be reconstructed from the received remainder value. The size of the range is X, corresponding to the modulo X operation performed in the header compressor of FIG. 10. The location of the range relative to the latest reconstructed field value produced by the field reconstructor 110 can advantageously be defined, for example, based on the known or expected characteristics of the packet communication application and/or the known or expected characteristics of the packet communication path between the compressor and decompressor.

In one example, the range is given by −M to X−1−M. Each value in the range −M to X−1−M represents a possible difference between the latest reconstructed field value and the new field value being reconstructed by the decompressor. As one example, if M=−1 and X=16, then the range is 1 to 16, and this range represents 16 possible field values which respectively exceed the latest reconstructed field value by 1 through 16. As another example, if X=16 and M=1, then the range is given by −1 to 14. This range represents 16 possible field values. One of the values (corresponding to −1 in the range) is 1 less than the latest reconstructed field value, another of the values (corresponding to 0 in the range) is equal to the latest reconstructed field value, and the remaining 14 possible field values respectively exceed the last reconstructed field value by 1 through 14.

Positive values of M can, for example, be used effectively to accommodate sequence number fields (for example RTP sequence number fields) of packets that arrive out of order. Positive values of M are also advantageous, for example, to accommodate negative delta time stamp field values for packets including so-called B-pictures (bidirectionally predicted pictures in an MPEG application). In MPEG, a B-picture is conventionally sent after its temporarily surrounding anchor pictures, thus leading to both forward and backward jumps in the time stamp field value as compared to the transmission order. Thus, the time stamp delta is sometimes negative and sometimes jumps forward, which is a well known phenomenon to workers in the art. As mentioned above, positive values of M can accommodate negative deltas. Selecting M such that the range includes 0 permits accommodation of pictures that are partitioned into many packets with the same time stamp field.

Figure 12:
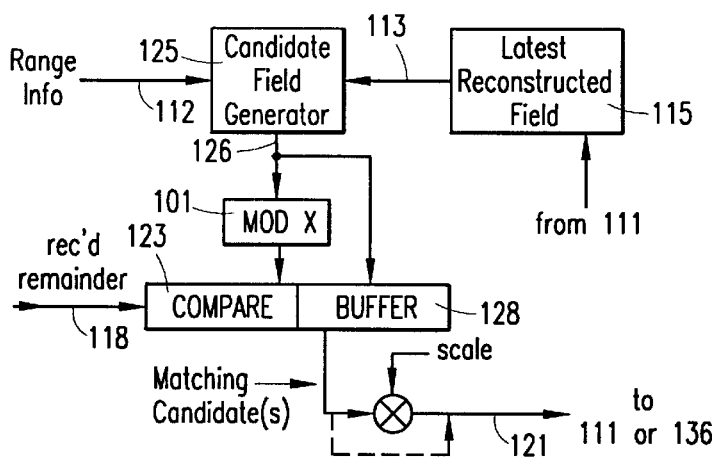
FIG. 12 diagrammatically illustrates an exemplary embodiment of a field reconstructor used in the header decompressor of FIG. 11.

FIG. 12 diagrammatically illustrates an exemplary embodiment of the field reconstructor 110 of FIG. 11. The range information and the latest reconstructed field are respectively input at 112 and 113 to a candidate field generator 125, which responds to these inputs to provide at 126 a number of field value candidates equal to the size of the range, for example, equal to X of the modulo X operator 101. The field value candidates at 126 are input to a modulo X operator 101 such as shown in FIG. 10, and are also buffered at 128. The modulo X operator 101 outputs remainders respectively associated with the buffered field value candidates.

A comparator 123 compares the received remainder at 118 to the remainders of each of the field value candidates. Because there are X adjacent field value candidates in the range, and because the received remainder at 118 represents the remainder of a divide by X operation, the remainder of one of the X field value candidates will match the received remainder 118, and the corresponding field value candidate is output at 122 from buffer 128. As shown in FIG. 12, the candidate value output at 122 can be scaled up as necessary to accommodate any downscaling that may have been done in the header compressor of FIG. 10. Such upscaling can include adding the remainder that results from the downscaling division operation in the header compressor, which remainder is generally a constant that need only be transmitted once, for example, by transmitting the full field value at the start of the packet stream, thereby implicitly informing the header decompressor of the downscaling remainder. In the FIG. 12 embodiment, the candidate value at 121 (scaled or not) can be output as the reconstructed field value 111 of FIG. 11. This reconstructed field value is also stored in buffer 115 for use as the latest reconstructed field in the next header field reconstruction operation.

In an embodiment where X=12, four bits are necessary to represent the field value modulo 12 at the output of operator 101 (FIG. 10), but not all possible bit patterns of the four bits are necessary. In particular, for example, only the combinations 0000 to 1011 are necessary to represent the 12 possible remainders when a header field value is divided by 12 in operator 101, thus advantageously leaving four bit patterns (1100 to 1111) for other purposes such as signaling of special events. Examples of such events include signaling the type of the packet in case it is not an ordinary compressed packet, but is instead a context request, a context update or contains static or full field values.

Full header field values such as RTP time stamp field values and RTP sequence number field values are typically 16 or 32 bit unsigned integers which wrap around to 0 as the field values increment from $2^{16}-1$ or $2^{32}-1$. Thus, if X is not a power of 2, then the remainders produced by the modulo X operator 101 of FIG. 10 will not complete their cycle when the field values wrap around to 0. For example, for modulo 12 (X=12), the following sequence will result as the field values increment toward and through the 0 wrap around:

... (65531,11) (65532,0) (65533,1) (65534,2) (65535,3) (0,0) (1,1) ...

where the first number in each set of parentheses is the full 16 bit field value, and the second number is the field value modulo 12. If the latest reconstructed field value is 65531, and the received remainder is 1, and assuming for this example that M=−1, then two of the twelve candidate field values, namely 65533 and 1, will have remainders that match the received remainder in the comparator 123 of FIG. 12.

Figure 13:
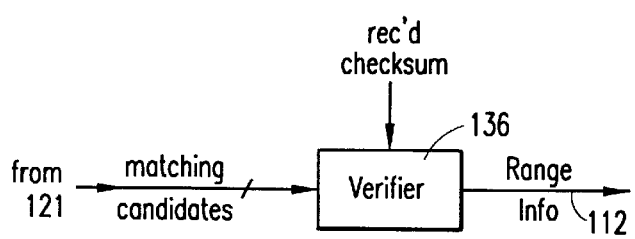
FIG. 13 diagrammatically illustrates an exemplary embodiment of a verifier used in the field reconstructor of FIG. 12.

One exemplary solution to this problem is to use the received checksum to verify which of the two possible candidates is correct. As shown in the embodiment of FIG. 13, a verifier 136 can be coupled to the (scaled or not) buffer output 121 to receive the two matching candidate field values output from buffer 128. The verifier 136 can compute a checksum for each candidate value, compare it to the received checksum, and select the candidate whose checksum matches the received checksum. This candidate can then be provided as the reconstructed field value at 111.

Another solution to avoid getting one shorter remainder cycle is to keep the cycle of the sent values, and adjust the received values to reconstruct the remainder:

... (65531,11) (65532,0) (65533,1) (65534,2) (65535,3) (0,4) (1,5) ...

For this case, it means that the values sent correspond to remainder +N, where N is 0,4, or 8 and goes through a cycle with each wrap around.

Figure 15:
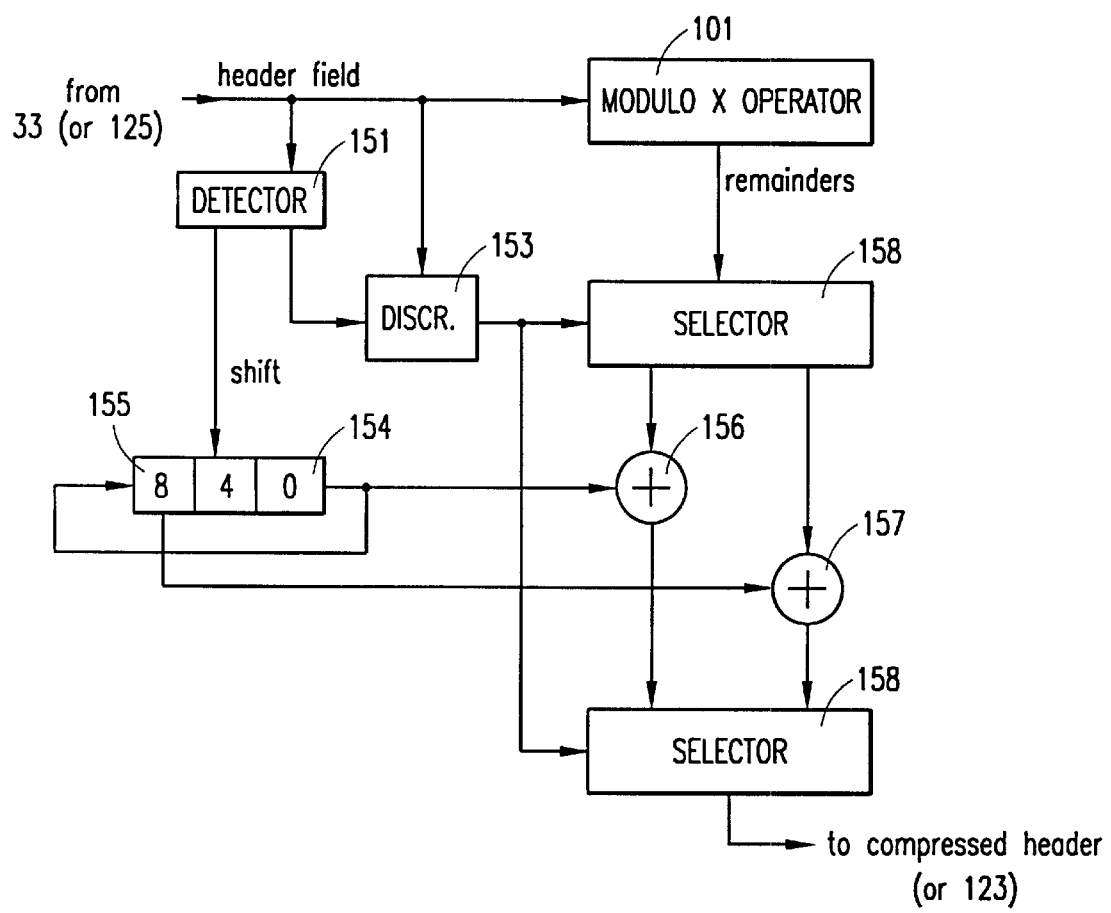
FIG. 15 diagrammatically illustrates an exemplary embodiment of selecting a correct header field candidate from any number of matching header field candidates according to the present invention.

This is illustrated in the exemplary embodiments of FIG. 15, wherein the header field, received from separator 33 in exemplary header compressor embodiments, or received from candidate field generator 125 in exemplary header decompressor embodiments, is input to a wrap around detector 151 as well as to the modulo X operator 101. The wrap around detector 151 detects when the header field values are in the vicinity of a wrap around. When an upcoming wrap around is detected, the wrap around detector 151 shifts a circular shift register 152 that is initially loaded as shown in FIG. 15. Shift register location 154 is coupled to an adder 156 and is also fed back to a shift register location 155, which latter shift register location is coupled to an adder 157.

The wrap around detector 151 is also coupled to a discriminator 153 having an input coupled to receive the header field values, and having an output coupled to a selector 158. The discriminator 153 discriminates between the high header field values that precede the 0 wrap around, and the low header field values that come after the 0 wrap around. For as long as the wrap around detector 151 detects that the header field values are in the vicinity of a wrap around, the detector 151 keeps the discriminator 153 enabled. While enabled, the discriminator 153 controls selector 158 to select adder 156 for low header field values in the wrap around vicinity (i.e., 0 and values after 0), and to select adder 157 for high header field values in the wrap around vicinity (values before 0). The wrap around detector 151 disables the discriminator 153 when the header field values are not in the wrap around vicinity, in which case the discriminator 153 controls selector 158 to select only adder 156.

Thus, when the first wrap around occurs, detector 151 shifts register 152, so adder 156 adds 4 (from location 154) to the remainders associated with the low header field values beginning at 0, and adder 157 adds 0 (from location 155) to the remainders associated with the high header field values that precede the wrap around. At the next wrap around, detector 151 shifts register 152 again, so the adder 156 adds 8 to the remainders associated with the low header field values beginning at 0, and the adder 157 adds 4 to the remainders associated with the high header field values that precede the wrap around.

For a given value of X, the range of possible field values at the decompressor can be increased according to desired performance. For example, the range can be defined as −M to 2X−1−M. Thus, for example, with M=−1 and X=16, the range of possible field values would be 1 to 32. The received remainder value 118 will match the remainders of two candidates in this range. The correct candidate can be identified, for example, by the checksum verification operation described above relative to FIG. 13. The embodiment of FIG. 13 can of course select the correct candidate from any number of matching candidates resulting from any size range, −M to kX−1−M, where k=2,3 . . . .

Figure 14:
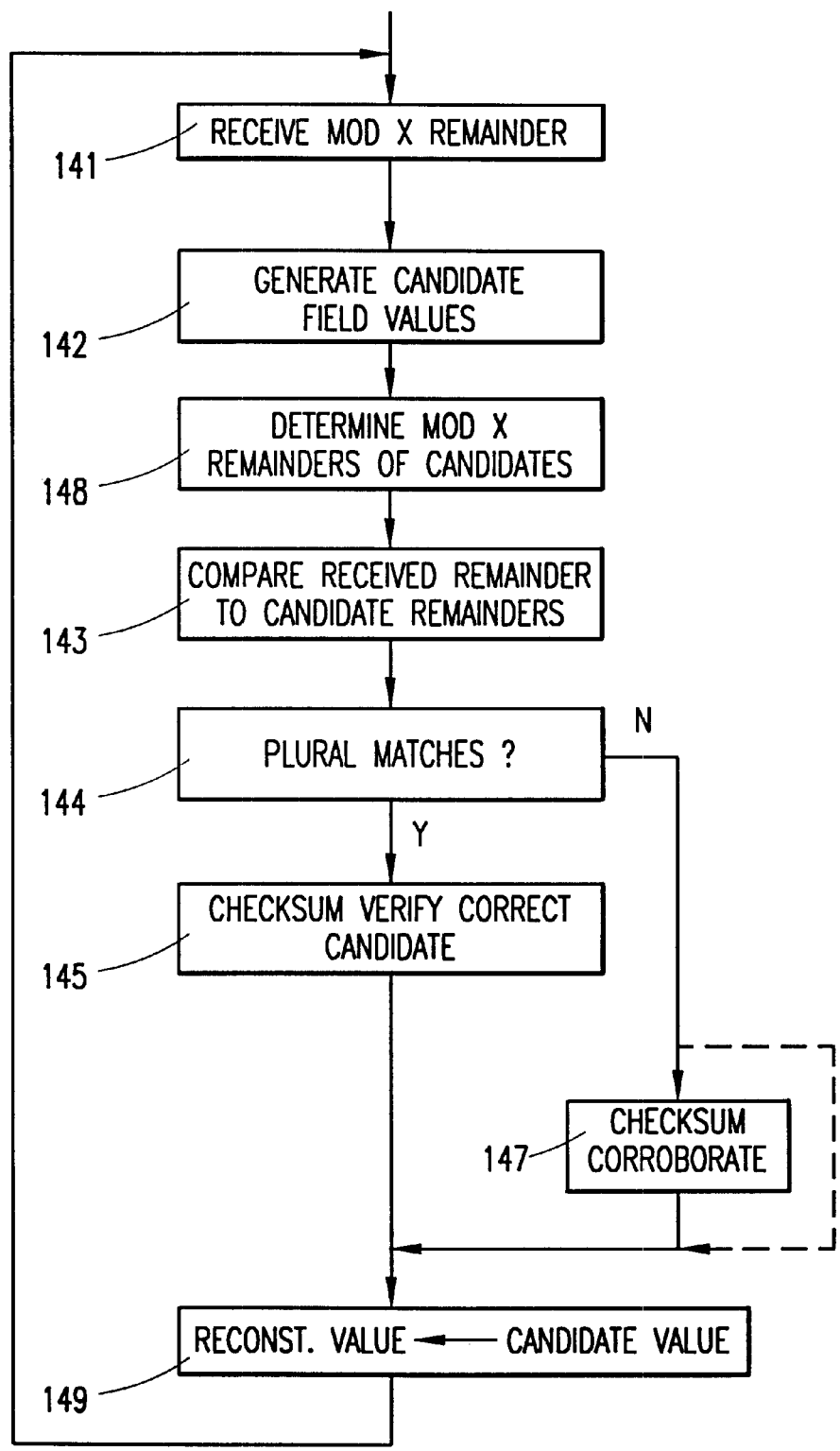
FIG. 14 illustrates exemplary operations which can be performed by the header decompressor embodiments illustrated in FIGS. 11–13.

FIG. 14 illustrates exemplary operations which can be performed by the header decompressor embodiments illustrated in FIGS. 11–13. At 141, the compressed header field is received as a modulo X remainder value. At 142, the range information and the latest reconstructed field value are used to generate the candidate field values. At 148, the modulo X remainders of the candidate values are determined. At 143, the received remainder value is compared to the remainder values of the respective candidate field values to determine the matching candidate(s). It is then determined at 144 whether or not there are plural matching candidates. If so, the candidate values are subjected at 145 to the checksum verification process to determine the correct candidate value, which is then loaded as the reconstructed field value at 149. If there is only one matching candidate at 144, then that candidate value can be optionally corroborated by checksum verification at 147 or, as indicated by dotted lines, the candidate can at 149 be directly loaded as the reconstructed field value.

It will be appreciated by workers in the art that the header compression/decompression techniques described above with respect to FIGS. 10–14 are generally applicable to a variety of header fields, and can be tailored to the characteristics of a particular application and/or communication path.

It will be evident to workers in the art that the above-described embodiments can be readily implemented by suitable modifications in software, hardware, or both, in header compressors and decompressors of conventional packet data transmitting and receiving stations.

The previous description is of a preferred embodiment for implementing the invention, and the scope of the invention should not necessarily be limited by this description. The scope of the present invention is instead defined by the following claims.

What is claimed is:

1. A method of producing a compressed header field from an original header field, comprising:

dividing a value of the original header field by a first predetermined number to obtain a remainder; and generating the compressed header field based on the obtained remainder.

2. The method of claim 1, wherein said generating step includes selectively adding to the remainder a second predetermined number.

3. The method of claim 2, including performing said adding step if the first predetermined number is a number other than a power of 2.

4. A method of producing at a header decompressor a reconstructed header field intended to match an original header field represented by a received compressed header field received at the header decompressor via a packet communication path, comprising:

identifying a first number of reconstructed header field candidates based on a second number used by a header compressor in combination with the original header field to produce for transmission to the header decompressor a compressed header field corresponding to the received compressed header field; and selecting one of the reconstructed header field candidates as the reconstructed header field.

5. The method of claim 4, wherein said identifying step includes identifying the candidates based on a latest reconstructed header field produced at the header decompressor.

6. The method of claim 5, wherein said step of identifying the candidates based on the latest reconstructed header field includes identifying a range of possible values of the reconstructed header field in response to said first number and a value of the latest reconstructed header field.

7. The method of claim 6, wherein said step of identifying a range includes positioning the range relative to the value of the latest reconstructed header field.

8. The method of claim 7, wherein the range includes the value of the latest reconstructed header field.

9. The method of claim 7, wherein the range is offset from the value of the latest reconstructed header field.

10. The method of claim 7, wherein said step of positioning the range relative to the value of the latest reconstructed header field includes positioning the range in response to characteristics of a communication application that produced the original header field.

11. The method of claim 7, wherein said step of positioning the range relative to the value of the latest reconstructed header field includes positioning the range in response to characteristics of the packet communication path.

12. The method of claim 4, wherein said selecting step includes comparing the received compressed header field to compressed header fields respectively associated with the reconstructed header field candidates, and selecting as the reconstructed header field one reconstructed header field candidate whose associated compressed header field matches the received compressed header field.

13. The method of claim 12, wherein said last-mentioned selecting step includes using a checksum received at the header decompressor via the packet communication path to select one reconstructed header field candidate from among a plurality of reconstructed header field candidates whose respectively associated compressed header fields match the received compressed header field.

14. The method of claim 4, wherein the compressed header field represents a remainder resulting from dividing a value of the original header field by the second number.

15. The method of claim 4, wherein the first number is equal to the second number.

16. The method of claim 4, wherein the first number is twice the second number.

17. A header compressor for producing a compressed header field from an original header field, comprising:
   an input for receiving the original header field in RTP protocol;
   an apparatus coupled to said input for providing in response to said original header field a remainder that results when a value of the original header field in RTP protocol is divided by a first predetermined number; and
   an output coupled to said apparatus for outputting said compressed header field in RTP protocol having a value based on said remainder.

18. A header decompressor for producing a reconstructed header field intended to match an original header field, comprising:
   an input for receiving a compressed header field representing said original header field;
   a first apparatus for identifying a first number of reconstructed header field candidates based on a second number used by a header compressor in combination with the original header field to produce for transmission to said header decompressor a compressed header field corresponding to said compressed header field received at said input; and
   a second apparatus coupled to said first apparatus and said input for selecting one of said reconstructed header field candidates as the reconstructed header field.

19. The apparatus of claim 18, wherein said first number is equal to said second number.

20. The apparatus of claim 18, wherein said first number is twice said second number.

* * * * *